US011701601B2

(12) United States Patent
Miranda et al.

(10) Patent No.: US 11,701,601 B2
(45) Date of Patent: Jul. 18, 2023

(54) MONOLITHIC ASSEMBLY INTEGRATING OPEN CELL STRUCTURE WITH RETAINING PARTITION

(71) Applicant: Hamilton Sundstrand Corporation, Charlotte, NC (US)

(72) Inventors: Joseph Miranda, Suffield, CT (US); Mark A. Zaffetti, Suffield, CT (US); Gregory John Quinn, Windsor, CT (US); Holden T. Ranz, West Hartford, CT (US); Joseph C. Rampone, Colchester, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 339 days.

(21) Appl. No.: 16/922,026

(22) Filed: Jul. 7, 2020

(65) Prior Publication Data

US 2022/0008843 A1 Jan. 13, 2022

(51) Int. Cl.

*B01D 25/24* (2006.01)
*B01D 46/00* (2022.01)
*B01D 46/10* (2006.01)
*B01D 46/30* (2006.01)

(52) U.S. Cl.

CPC ......... *B01D 25/24* (2013.01); *B01D 46/0005* (2013.01); *B01D 46/10* (2013.01); *B01D 46/30* (2013.01)

(58) Field of Classification Search

CPC ........ B01D 25/24; B01D 46/00; B01D 46/05; B01D 46/10; B01D 46/30
USPC ........................................................... 55/502
See application file for complete search history.

(56) References Cited

U.S. PATENT DOCUMENTS 5,433,904 A * 7/1995 Noky .................... F01N 3/0222 264/630
2008/0148936 A1 6/2008 Baksh
2019/0083954 A1 3/2019 Rezaei et al.
2019/0366235 A1* 12/2019 De Los Reyes ....... B01D 15/22
2020/0001265 A1 1/2020 Tegrotenhuis et al.
2020/0078722 A1 3/2020 Kiffer et al.

FOREIGN PATENT DOCUMENTS

WO 2015023678 A1 2/2015
WO 2017192042 A1 11/2017

OTHER PUBLICATIONS

European Search Report for European Application No. 21178161.2; dated Dec. 14, 2021; 146 pages.

* cited by examiner

*Primary Examiner* — Robert A Hopkins
*Assistant Examiner* — Qianping He
(74) *Attorney, Agent, or Firm* — Cantor Colburn LLP

(57) ABSTRACT

A monolithic open cell structure apparatus including an open cell structure housing including a first side, a second side opposite the first side, a first opening located at the first side, and a second opening located opposite the first opening at a second side. The monolithic open cell structure apparatus also including a filtration portion extending from the first side to the second side within the open cell structure housing. The monolithic open cell structure apparatus further including a retaining partition that at least partially encloses the filtration portion within the open cell structure housing. The monolithic open cell structure apparatus is a single piece including a unitary structure.

16 Claims, 6 Drawing Sheets

310
265
264
320
265
264
330
265
266
264
340
265
264
350
265
264
360
265
264
266

MONOLITHIC ASSEMBLY INTEGRATING OPEN CELL STRUCTURE WITH RETAINING PARTITION

BACKGROUND

The subject matter disclosed herein relates generally to the field of filtration systems incorporating chemical adsorbent beds, and more specifically to an apparatus for absorbing and removing carbon dioxide gas from an enclosed space.

Life support systems that are utilized in enclosed spaces such as submarines, spacecraft or space suits require the continuous removal of gaseous contaminants, specifically metabolically generated contaminants, and more specifically carbon dioxide. A regenerative carbon dioxide removal system is utilized for this purpose and commonly includes amine beds that are placed in contact with a flow of carbon dioxide laden air. The amine beds adsorb carbon dioxide from the air stream through commonly understood chemical processes and reactions.

A first filtration bed is utilized and removes carbon dioxide from an air stream for a period of time. Another filtration bed is then switched into contact with the carbon dioxide laden air stream. The first filtration bed is then desorbed to expel carbon dioxide in preparation for the next cycle.

BRIEF SUMMARY

According to one embodiment, a monolithic open cell structure apparatus is provided. The monolithic open cell structure apparatus including an open cell structure housing including a first side, a second side opposite the first side, a first opening located at the first side, and a second opening located opposite the first opening at a second side. The monolithic open cell structure apparatus also including a filtration portion extending from the first side to the second side within the open cell structure housing. The monolithic open cell structure apparatus further including a retaining partition that at least partially encloses the filtration portion within the open cell structure housing. The monolithic open cell structure apparatus is a single piece including a unitary structure.

In addition to one or more of the features described above, or as an alternative, further embodiments may include that the monolithic open cell structure apparatus is a monolithic structure formed via an additive manufacturing technique.

In addition to one or more of the features described above, or as an alternative, further embodiments may include that the additive manufacturing technique is powder bed fusion additive manufacturing.

In addition to one or more of the features described above, or as an alternative, further embodiments may include that the monolithic open cell structure apparatus has no joints or seams.

In addition to one or more of the features described above, or as an alternative, further embodiments may include that the filtration portion has an open cell structural geometry configured to perform filtration.

In addition to one or more of the features described above, or as an alternative, further embodiments may include that the open cell structural geometry is a tetradecahedron structure.

In addition to one or more of the features described above, or as an alternative, further embodiments may include that the open cell structural geometry is a honeycomb open cell structure.

In addition to one or more of the features described above, or as an alternative, further embodiments may include that the open cell geometry includes a plurality of cells and the retaining partition is integrated into each of the plurality of cells.

In addition to one or more of the features described above, or as an alternative, further embodiments may include that the open cell geometry includes a plurality of cells and the retaining partition is integrated into each of the plurality of cells.

In addition to one or more of the features described above, or as an alternative, further embodiments may include that each of the plurality of cells includes a section of the retaining partition configured to fit within the cell.

In addition to one or more of the features described above, or as an alternative, further embodiments may include that the retaining partition includes a plurality of pillars.

In addition to one or more of the features described above, or as an alternative, further embodiments may include that each of the plurality of pillars have a circular shape.

In addition to one or more of the features described above, or as an alternative, further embodiments may include that each of the plurality of pillars have a diamond shape.

In addition to one or more of the features described above, or as an alternative, further embodiments may include that each of the plurality of pillars have a teardrop shape.

In addition to one or more of the features described above, or as an alternative, further embodiments may include that each of the plurality of pillars have a square shape.

In addition to one or more of the features described above, or as an alternative, further embodiments may include that the plurality of pillars are organized in a first row and a second row in a staggered pattern.

In addition to one or more of the features described above, or as an alternative, further embodiments may include that the plurality of pillars are organized in a first row that is arched in shape.

In addition to one or more of the features described above, or as an alternative, further embodiments may include that the plurality of pillars are oriented parallel to each other and extend across the cell.

According to another embodiment, a method of manufacturing a monolithic open cell structure apparatus is provided. The method including: forming, using an additive manufacturing technique, an open cell structure housing including a first side, a second side opposite the first side, a first opening located at the first side, and a second opening located opposite the first opening at a second side; forming, using the additive manufacturing technique, a filtration portion extending from the first side to the second side within the open cell structure housing; and forming, using the additive manufacturing technique, a retaining partition, the retaining portion at least partially encloses the filtration portion within the open cell structure housing. The monolithic open cell structure apparatus is a single piece including a unitary structure.

In addition to one or more of the features described above, or as an alternative, further embodiments may include that the monolithic open cell structure apparatus is a monolithic structure formed via an additive manufacturing technique.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

A multi-piece open cell structure apparatus for the amine beds is typically constructed utilizing a complex arrangement of a multitude of brazed amine support features, foam filters, and screens. The assembly process is complex and time consuming due to the multitude of parts involved. The brazing process is a process that requires the entire assembly to be exposed to a temperature sufficient to form the desired brazed joints and leaves visible joints and seams. Additionally, structural limitations of screens and associated screen frames that are assembled together decrease flow through the screens while increasing pressure drops. Embodiments disclosed herein relate to a monolithic assembly that seeks to simplify the prior assembly process by reducing the number of components and increasing filtering while reducing pressure drop through the filtration bed assembly.

Figure 1:
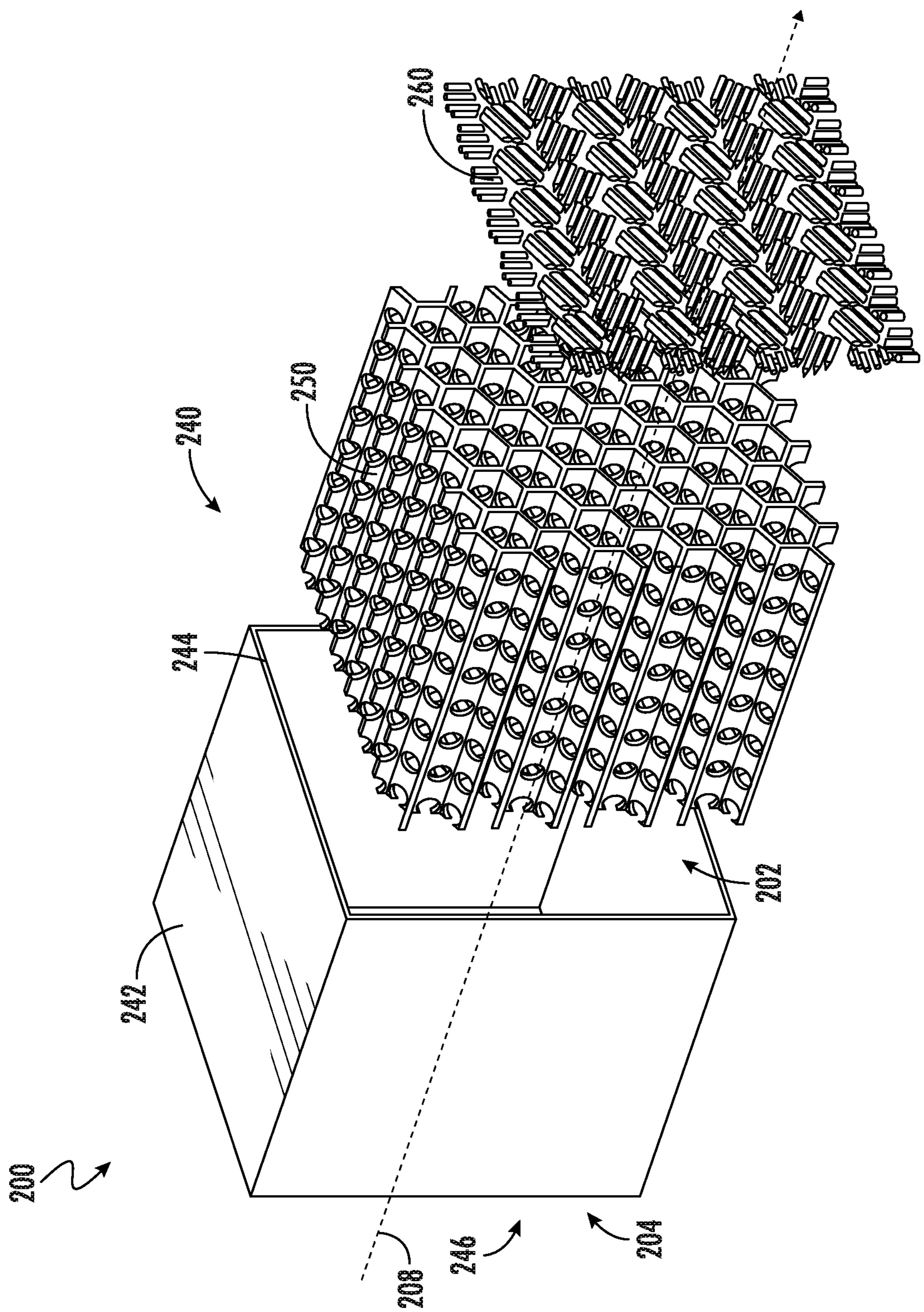
FIG. 1 illustrates an exploded view of a monolithic open cell structure apparatus, according to an embodiment of the present disclosure.

Referring now to FIG. 1, an isometric exploded view of a monolithic open cell structure apparatus 200 is illustrated, according to an embodiment of the present disclosure. The monolithic open cell structure apparatus 200 is a monolithic structure formed via an additive manufacturing technique. The monolithic open cell structure apparatus 200 is a monolithic structure rather than being assembled from separate individually formed components that are then assembled, as in previous designs. The term monolithic may be defined as an object that is cast or formed as single piece without joints or seams. In other words, the monolithic open cell structure apparatus 200 is formed as a single piece comprising a unitary structure. In an embodiment, the monolithic open cell structure apparatus 200 has no joints or seams. The monolithic open cell structure apparatus 200 may be manufactured or formed via an additive manufacturing technique known to one of skill in the art. In an embodiment, the monolithic open cell structure apparatus 200 may be manufactured by growing the structure all at once one layer at a time. In an embodiment, the monolithic open cell structure apparatus 200 may be manufactured by powder bed fusion additive manufacturing.

Advantageously, by manufacturing the monolithic open cell structure apparatus 200 as a monolithic structure using additive manufacturing it eliminates the manufacturing and/or procurement of all the separate components in a multi-piece assembly, which saves cost and time. Also advantageously, by manufacturing the monolithic open cell structure apparatus 200 as a monolithic structure using additive manufacturing it eliminates the need to braze or fuse all of the separate components of a multi-piece open cell structure apparatus, which saves cost and time. There are additional weight savings and strength optimizations through the use of additive manufacturing.

The monolithic open cell structure apparatus 200 is composed of an assembly 240 having an open cell structure housing 242. The open cell structure housing 242 includes a first opening 244 located at a first side 202 of the open cell structure housing 242 and a second opening 246 located opposite the first opening 244 at a second side 204 of the open cell structure housing 242. The assembly 240 includes a filtration portion 250 that is located within the open cell structure housing 242 between the first opening 244 and the second opening 246.

Through the use of additive manufacturing, the material of the filtration portion 250 is no longer limited to a foam or foam-like material as previously utilized. The filtration portion 250 may be shaped by the additive manufacturing technique to have an engineered open cell structural geometry configured to perform filtration. The open cell structural geometries may include but are not limited to a Kelvin cell geometry.

The assembly 240 also includes a retaining partition 260. The retaining partition 260 at least partially encloses the filtration portion 250 within the open cell structure housing 242. The retaining partition 260 may be located at the first side 202 of the open cell structure housing 242 to at least partially enclose the filtration portion 250 or at any other location within open cell structure housing 242. The retaining partition 260 may be configured to hold filtration beads in the filtration portion 250. There may be a second retaining partition (not shown) on the second side 204. The second retaining partition may be used to hold filtration beads in the filtration portion 250 if filtration beads are utilized. Advantageously, since the retaining partition 260 is produced via additive manufacturing there is no need for a screen structural frame and a separate screen. This improves flow characteristics through the retaining partition 260 as some of the screen would have been previously blocked by a structural frame.

Air 208 to be filtered is configured to flow into the monolithic open cell structure apparatus 200 through the second opening 246 of the open cell structure housing 242, through the filtration portion 250 and then through the retaining partition 260 to exit the monolithic open cell structure apparatus 200.

Figure 2:
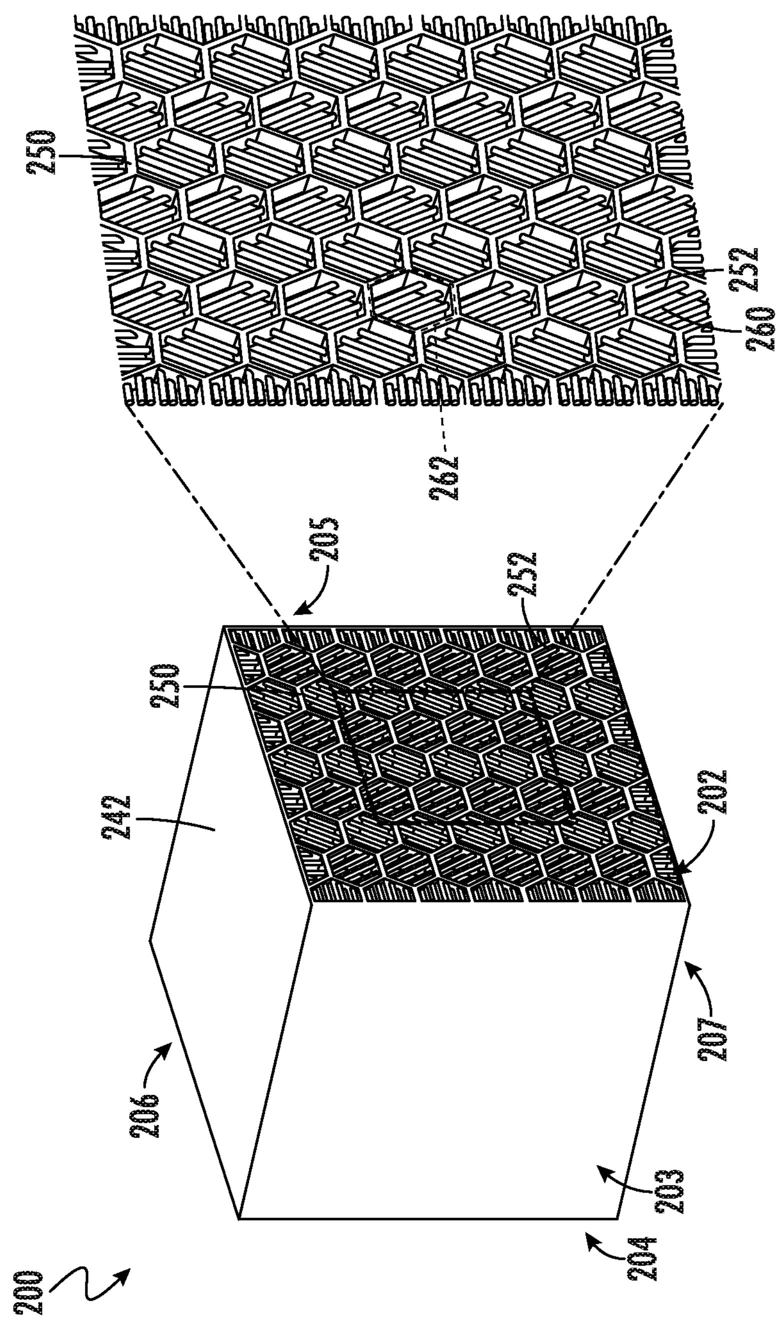
FIG. 2 illustrates an isometric view of a monolithic open cell structure apparatus with filtration portion having a honeycomb structure and an enlarged view of the filtration portion and a retaining partition integrated into the filtration portion, in accordance with an embodiment of the present disclosure.

Referring now to FIG. 2, an isometric view of the monolithic open cell structure apparatus 200 with a filtration portion 250 having a honeycomb open cell structure is illustrated, in accordance with an embodiment of the disclosure.

The monolithic open cell structure apparatus 200 may be built up in layers using additive manufacturing from the first side 202 to the second side 204 or from the second side 204 to the first side 202. The second side 204 is located opposite the first side 202. The monolithic open cell structure apparatus 200 may be built up in layers using additive manufacturing from a third side 203 to a fourth side 205 or from the fourth side 205 to the third side 203. The fourth side 205 is located opposite the third side 203. The monolithic open cell structure apparatus 200 may be built up in layers using additive manufacturing from a fifth side 206 to a sixth side 207 or from the sixth side 207 to the fifth side 206. The sixth side 207 is located opposite the fifth side 206. Alternatively, monolithic open cell structure apparatus 200 may be built up on an angle, such as, for example, a 45° angle.

As illustrated in FIG. 2, the monolithic open cell structure apparatus 200 is formed as a single piece comprising a unitary structure. The filtration portion 250 is located within the open cell structure housing 242. The retaining partition 260 is formed within each honeycomb 252 of the filtration portion 250. The open cell geometry of the filtration portion 250 includes a plurality of cells or honeycombs 252 and the retaining partition 260 is integrated into each of the plurality of cells. In other words, the retaining partition 260 is integrated with or into the filtration portion 250. Each cell or honeycomb 252 of the open cell geometry has a section 262 of the retaining partition 260 configured to fit within the cell or honeycomb 252.

Figure 3:
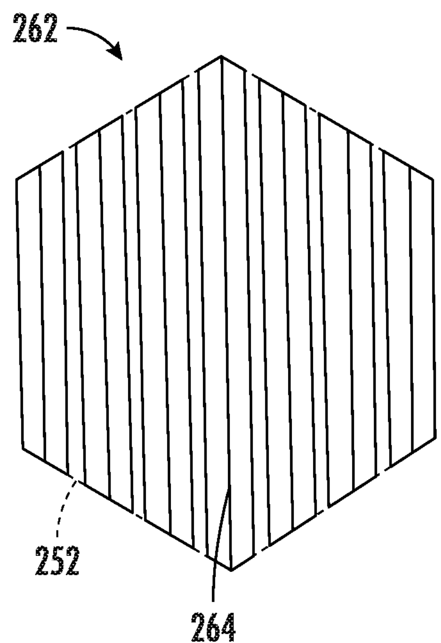
FIG. 3 illustrates a head-on view of a retaining partition section of the retaining partition with a plurality of pillars, in accordance with an embodiment of the present disclosure.
Figure 4:
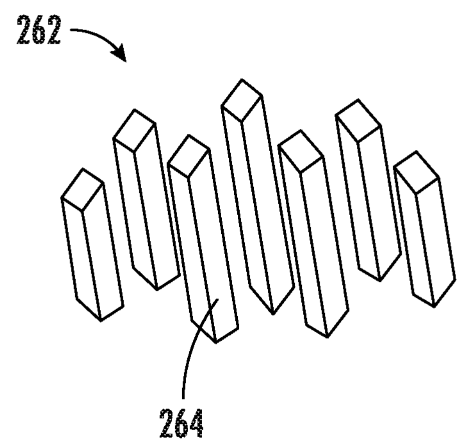
FIG. 4 illustrates an isometric view of the plurality of pillars, in accordance with an embodiment of the present disclosure.
Figure 5:
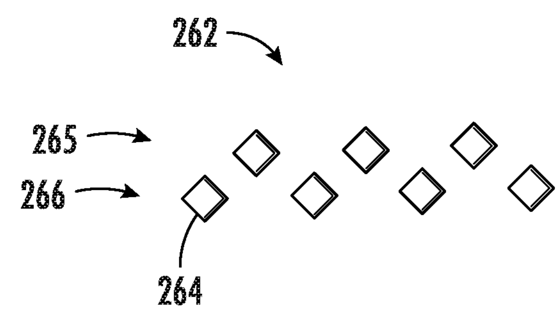
FIG. 5 illustrates a top view of the plurality of pillars, in accordance with an embodiment of the present disclosure.

Referring now to FIGS. 3, 4, and 5, with continue reference to FIGS. 1-2, an enlarged view of a section 262 of the retaining partition 260 is illustrated, in accordance with an embodiment of the disclosure. Each cell or honeycomb 252 of the open cell geometry has a section 262 of the retaining partition 260 configured to fit within the cell or honeycomb 252 (see FIG. 2). FIG. 3 illustrates a head-on view of the section 262 of the retaining partition 260. The section 262 of the retaining partition 260 is composed of a plurality of pillars 264. The pillars 264 may be oriented parallel to each other and extend across the cell or honeycomb 252. It is understood that while the honeycomb 252 is utilized herein for discussion, the filtration portion 250 is not limited to the honeycomb shape and may have any other shape.

FIG. 4 illustrates an isometric view of the section 262 of the retaining partition 260 and FIG. 5 illustrates a top view of the section 262 of the retaining partition 260. As illustrated in FIGS. 4 and 5, the pillars 264 may be staggered forward and aft of each other (e.g., a zig-zag pattern). In other words, the pillars 264 may be staggered from each other by being located in a first row 265 and a second row 266. As also illustrated in FIGS. 4 and 5, each pillar 264 may have a diamond shape. It is understood that while the pillars 264 in FIGS. 4 and 5 have a diamond shape, the embodiments disclosed herein are also applicable to pillars 264 having different shapes. Advantageously, the pillars 264 may be aerodynamically shaped to increase airflow through the pillars 264, thus reducing any pressure loss due to the retaining partition 260.

Figure 6:
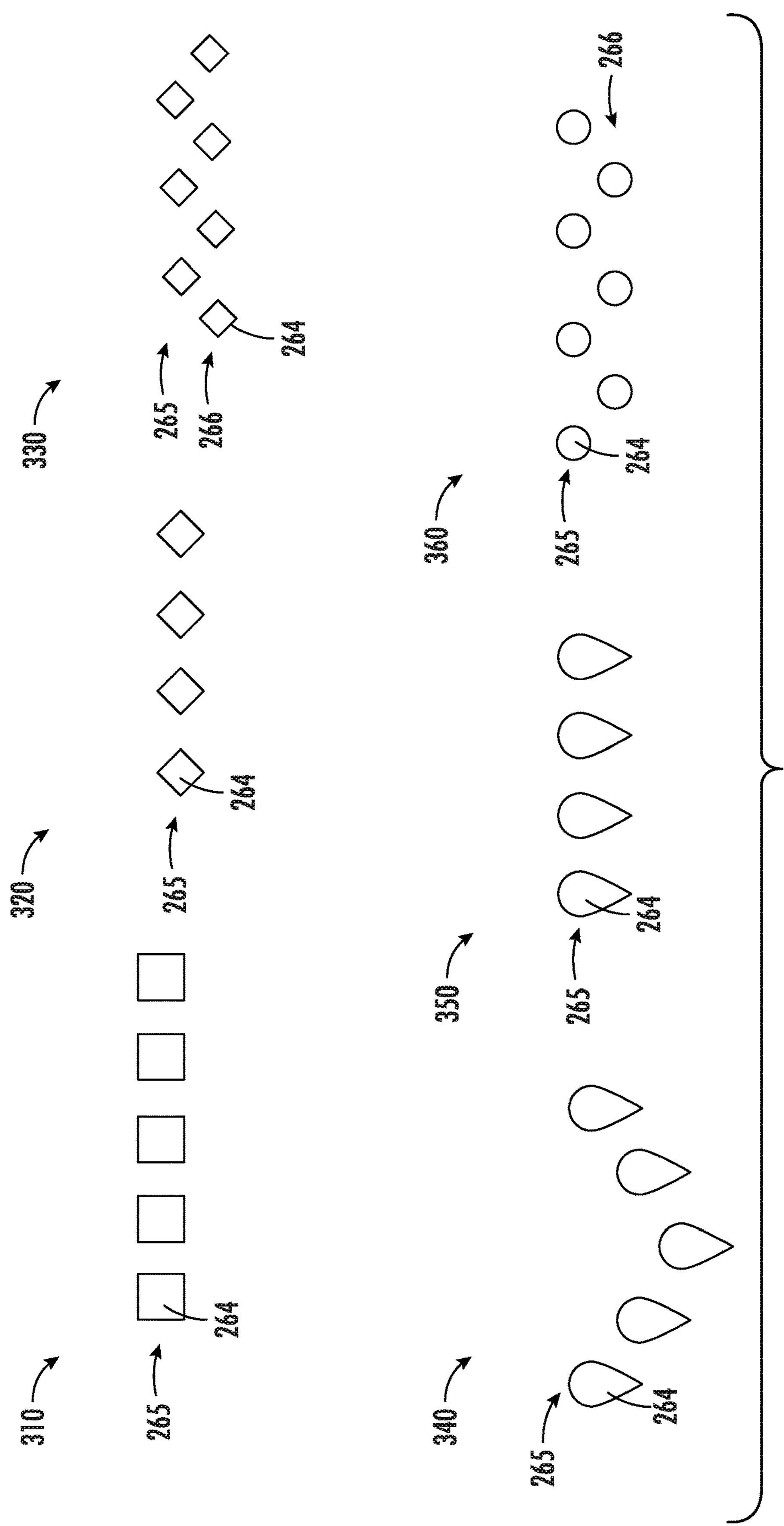
FIG. 6 illustrates a plurality of pillars of different shapes and organizations, in accordance with an embodiment of the present disclosure.

Referring now to FIG. 6, with continue reference to FIGS. 1-5, various shapes and configurations of the pillars 264 are illustrated, in accordance with an embodiment of the disclosure. It is understood that while various shapes and configurations of the pillars 264 are illustrated in FIG. 6, the embodiments disclosed herein are not limited to the shapes and configurations illustrated in FIG. 6. The pillars 264 may be square in shape and organized in a first row 265 that is straight in shape, as illustrated at 310 of FIG. 6. The pillars 264 may have a diamond shape and may be organized in a first row 265 that is straight in shape, as illustrated at 320 of FIG. 6. The pillars 264 may have a diamond shape and may be organized in a first row 265 and a second row 266 in a staggered pattern, as illustrated at 330 of FIG. 6. The first row 265 and the second row 266 at 330 are straight in shape. The pillars 264 may have a teardrop shape and may be organized in a first row 265 that is arched in shape, as illustrated at 340 of FIG. 6. The pillars 264 may have a teardrop shape and organized in a first row 265 that is straight in shape, as illustrated at 350 of FIG. 6. The pillars 264 may have a circular shape and may be organized in a first row 265 and a second row 266 in a staggered pattern, as illustrated at 360 of FIG. 6. The first row 265 and the second row 266 at 360 are straight in shape.

Figure 7:
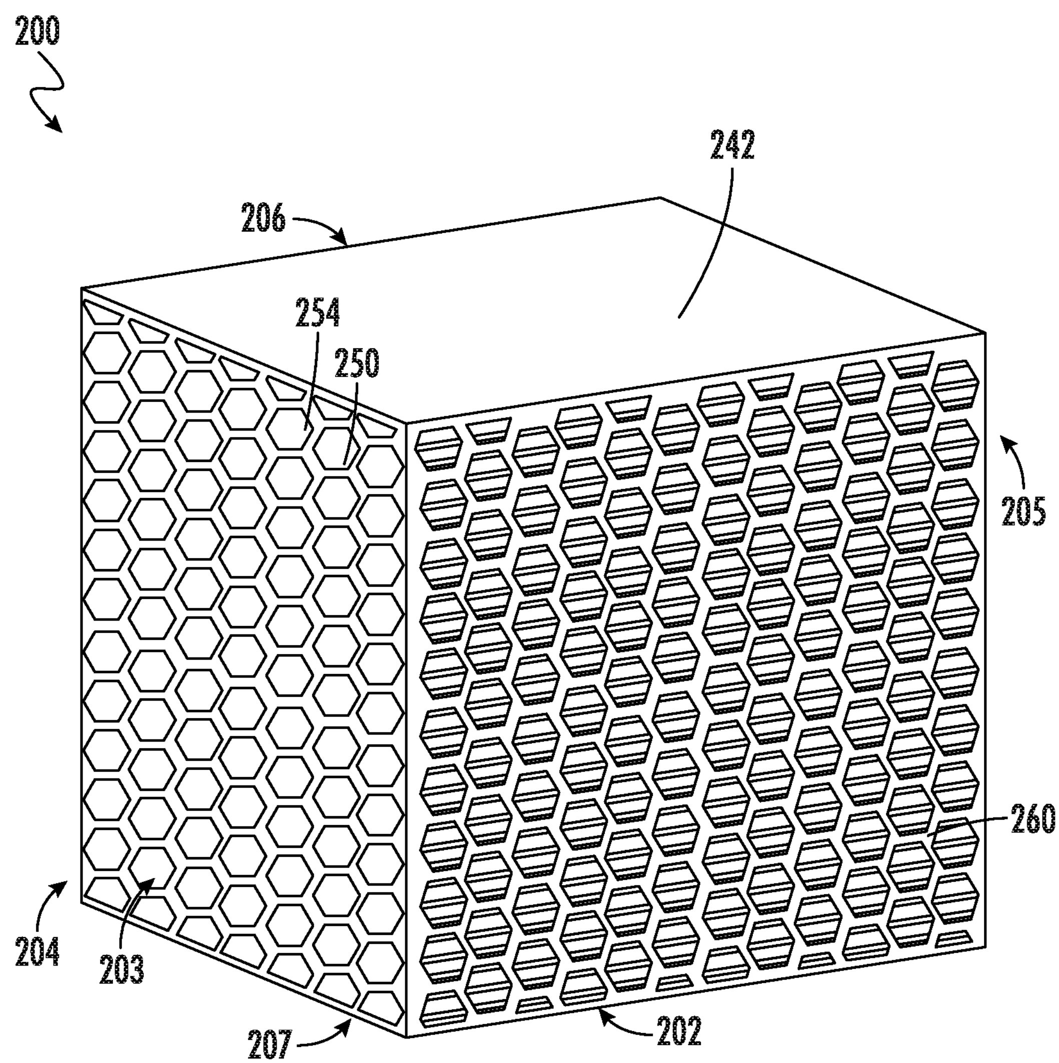
FIG. 7 illustrates an isometric view of a monolithic open cell structure apparatus with filtration portion having a tetradecahedron structure, in accordance with an embodiment of the present disclosure.

Referring now to FIG. 7, an isometric view of the monolithic open cell structure apparatus 200 with a filtration portion 250 having a tetradecahedron structure is illustrated, in accordance with an embodiment of the disclosure. It is understood that while a tetradecahedron structure is illustrated, the embodiments disclosed herein are not limited to the tetradecahedron structure.

The monolithic open cell structure apparatus 200 may be built up in layers using additive manufacturing from the first side 202 to the second side 204 or from the second side 204 to the first side 202. The second side 204 is located opposite the first side 202. The monolithic open cell structure apparatus 200 may be built up in layers using additive manufacturing from a third side 203 to a fourth side 205 or from the fourth side 205 to the third side 203. The fourth side 205 is located opposite the third side 203. The monolithic open cell structure apparatus 200 may be built up in layers using additive manufacturing from a fifth side 206 to a sixth side 207 or from the sixth side 207 to the fifth side 206. The sixth side 207 is located opposite the fifth side 206. Alternatively, monolithic open cell structure apparatus 200 may be built up on an angle, such as, for example, a 45° angle.

In FIG. 7, the open cell structure housing 242 on the third side 203 has been removed for clarity to visually see the tetradecahedrons 254 of the tetradecahedron structure.

As illustrated in FIG. 7, the monolithic swing bed absorption assembly 200 is formed as a single piece comprising a unitary structure. The filtration portion 250 is located within the open cell structure housing 242. The retaining partition 260 is formed as first side 202 of the open cell structure housing 242. In other words the retaining partition 260 is integrated with or into the open cell structure housing 242.

Figure 8:
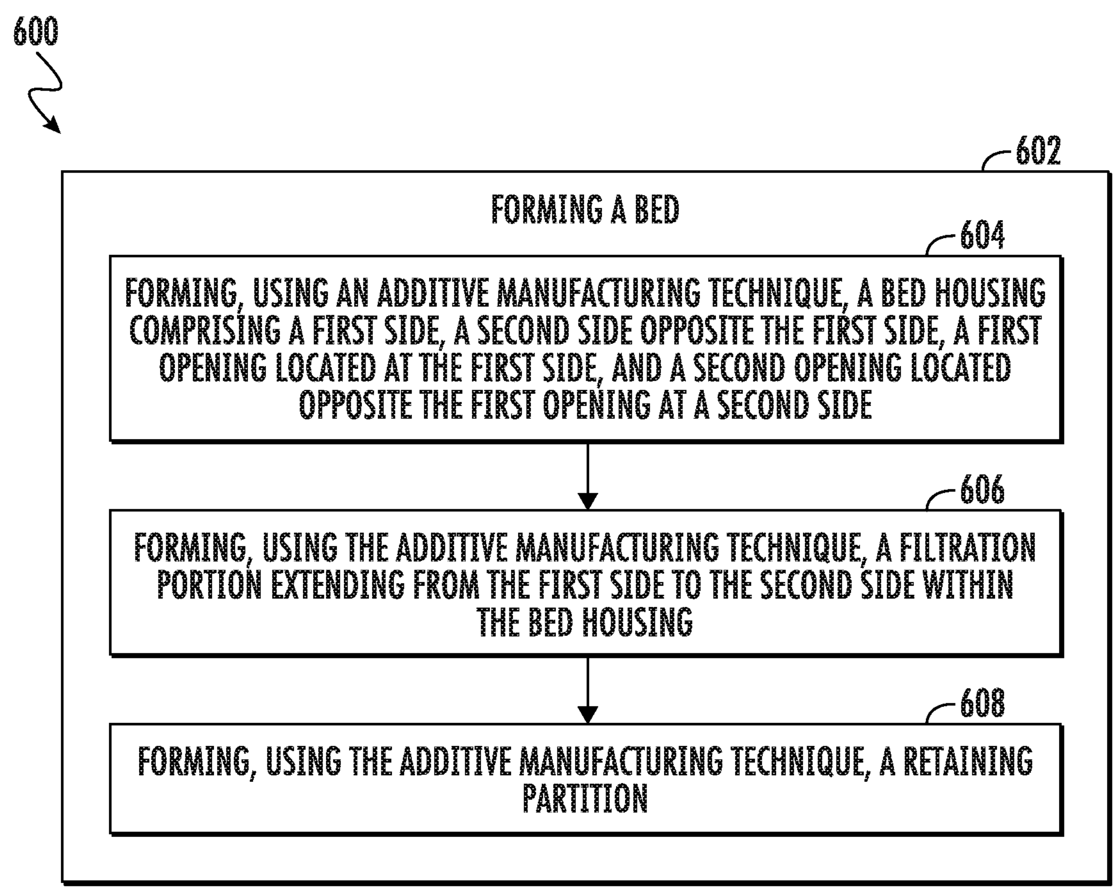
FIG. 8 illustrates a flow chart of a method of manufacturing the monolithic open cell structure apparatus, in accordance with an embodiment of the present disclosure.

Referring now to FIG. 8, with continued reference to FIGS. 1-7, a flow chart of method 600 of manufacturing the monolithic open cell structure apparatus 200 is illustrated, in accordance with an embodiment of the disclosure.

At block 602, an assembly 240 is formed comprising the steps of blocks 604, 606 and 608. In an embodiment, blocks 604, 606, and 608 may occur simultaneously or near simultaneously as each of the open cell structure housing 242, the filtration portion 250, and the retaining partition 260 are built up in layers.

At block 604, an open cell structure housing 242 is formed using an additive manufacturing technique. The open cell structure housing 242 comprising a first side 202, a second side 204 opposite the first side 202, a first opening 244 located at the first side 202, and a second opening 246 located opposite the first opening 244 at a second side 204. At block 606, a filtration portion 250 extending from the first side 202 to the second side 204 is formed within the open cell structure housing 242 using the additive manufacturing technique. At block 608, a retaining partition 260 is formed using the additive manufacturing technique. The monolithic open cell structure apparatus 200 is a single piece comprising a unitary structure.

The monolithic open cell structure apparatus 200 is a monolithic structure formed by the additive manufacturing technique. In an embodiment, the additive manufacturing technique is powder bed fusion additive manufacturing.

In an embodiment, the filtration portion 250 have an engineered open cell structural geometry configured to perform filtration. In another embodiment, the open cell structural geometry is a Kelvin cell geometry.

While the above description has described the flow process of FIG. 8 in a particular order, it should be appreciated that unless otherwise specifically required in the attached claims that the ordering of the steps may be varied and the order of the steps may occur simultaneously or near simultaneously, such as in layers.

Technical effects and benefits of the features described herein include forming a monolithic open cell structure apparatus through additive manufacturing.

A detailed description of one or more embodiments of the disclosed apparatus and method are presented herein by way of exemplification and not limitation with reference to the Figures.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A monolithic open cell structure apparatus, comprising:

an open cell structure housing comprising a first side, a second side opposite the first side, a first opening located at the first side, and a second opening located opposite the first opening at a second side;

a filtration portion extending from the first side to the second side within the open cell structure housing, the filtration portion having an open cell structural geometry that includes a plurality of cells; and a retaining partition that at least partially encloses the filtration portion within the open cell structure housing, wherein the retaining partition includes a plurality of individual sections, each section having a plurality of pillars configured to fit within a cell of the plurality of cells, wherein the monolithic open cell structure apparatus is a single piece comprising a unitary structure.

2. The monolithic open cell structure apparatus of claim 1, wherein the monolithic open cell structure apparatus has no joints or seams.

3. The monolithic open cell structure apparatus of claim 1, wherein the open cell structural geometry is configured to perform filtration.

4. The monolithic open cell structure apparatus of claim 3, wherein the open cell structural geometry is a tetradecahedron structure.

5. The monolithic open cell structure apparatus of claim 1, wherein the open cell structural geometry is a honeycomb open cell structure.

6. The monolithic open cell structure apparatus of claim 1, wherein the retaining partition is integrated into each of the plurality of cells.

7. The monolithic open cell structure apparatus of claim 5, wherein the retaining partition is integrated into each of the plurality of cells.

8. The monolithic open cell structure apparatus of claim 7, wherein each of the plurality of cells comprises a section of the retaining partition configured to fit within the cell.

9. The monolithic open cell structure apparatus of claim 1, wherein the plurality of pillars extend across the cell and terminate at opposing sides of the cell.

10. The monolithic open cell structure apparatus of claim 1, wherein each of the plurality of pillars have a circular shape.

11. The monolithic open cell structure apparatus of claim 9, wherein each of the plurality of pillars have a diamond shape.

12. The monolithic open cell structure apparatus of claim 9, wherein each of the plurality of pillars have a teardrop shape.

13. The monolithic open cell structure apparatus of claim 9, wherein each of the plurality of pillars have a square shape.

14. The monolithic open cell structure apparatus of claim 9, wherein the plurality of pillars are organized in a first row and a second row in a staggered pattern.

15. The monolithic open cell structure apparatus of claim 9, wherein the plurality of pillars are organized in a first row that is arched in shape.

16. The monolithic open cell structure apparatus of claim 1, wherein the plurality of pillars are oriented parallel to each other.

* * * * *